US012625051B2

(12) United States Patent
Song et al.

(10) Patent No.: US 12,625,051 B2
(45) Date of Patent: May 12, 2026

(54) HIGH-RELIABILITY CELL DETECTOR

(71) Applicant: SCINOMED LIMITED, Harrogate (GB)

(72) Inventors: HongBiao Song, Shanghai (CN); Xiao Wang, Shanghai (CN)

(73) Assignee: SCINOMED LIMITED, Harrogate (GB)

( * ) Notice: Subject to any disclaimer, the term of this patent is extended or adjusted under 35 U.S.C. 154(b) by 54 days.

(21) Appl. No.: 18/682,070

(22) PCT Filed: Aug. 24, 2021

(86) PCT No.: PCT/CN2021/114287
§ 371 (c)(1),
(2) Date: Feb. 7, 2024

(87) PCT Pub. No.: WO2023/019611
PCT Pub. Date: Feb. 23, 2023

(65) Prior Publication Data
US 2024/0353306 A1 Oct. 24, 2024

(30) Foreign Application Priority Data
Aug. 16, 2021 (CN) .......................... 202110941067.5

(51) Int. Cl.
G01N 15/14 (2024.01)
(52) U.S. Cl.
CPC .................................... G01N 15/14 (2013.01)
(58) Field of Classification Search
CPC . G01N 15/14; G01N 15/1434; G01N 15/1484
See application file for complete search history.

(56) References Cited

U.S. PATENT DOCUMENTS

| | | | | |
|---|---|---|---|---|
| 4,227,814 A | * | 10/1980 | Soodak | B04B 5/0442 356/414 |
| 2018/0128730 A1 | | 5/2018 | Lee et al. | |
| 2021/0208060 A1 | * | 7/2021 | Murray | G01N 21/05 |

FOREIGN PATENT DOCUMENTS

| | | |
|---|---|---|
| CN | 204286544 U | 4/2015 |
| CN | 204374094 U | 6/2015 |

(Continued)

*Primary Examiner* — Kevin K Pyo
(74) *Attorney, Agent, or Firm* — MUNCY, GEISSLER, OLDS & LOWE, P.C.

(57) ABSTRACT

A high-reliability cell detector, including a machine body (4) and a blood cell detector installed on the top of the machine body (4). The blood cell detector includes a vascular frame (1) installed on the top surface of the machine body (4), with a U-shaped tube orifice (2) at the top of the vascular frame (1), and the inner wall of the U-shaped tube orifice (2) is embedded with a transmissive photo sensor (3), which includes a light emitter and a light receiver. By installing a blood cell detector on the top of the blood plasma collection machine, the transfusion tube can be clamped at the top of the blood cell detector, allowing the blood cell detector to detect in real-time whether there are blood cells in the transfusion tube. The blood cell detector has high recognition accuracy, high reliability, and strong resistance to bubble interference. By embedding an electromagnetic suction cup (5) at the bottom of the blood cell detector, the installation position of the blood cell detector can be flexibly adjusted according to actual usage.

6 Claims, 4 Drawing Sheets

(56)  References Cited

FOREIGN PATENT DOCUMENTS

| CN | 205138590 U | 4/2016 |
|----|-------------|--------|
| CN | 205449628 U | 8/2016 |
| CN | 106267426 A | 1/2017 |
| CN | 206228671 U | 6/2017 |
| CN | 107167216 A | 9/2017 |
| CN | 107782702 A | 3/2018 |
| CN | 107790298 A | 3/2018 |
| CN | 207423630 U | 5/2018 |
| CN | 212569969 U | 2/2021 |
| CN | 213398602 U | 6/2021 |
| KR | 2003-0061753 A | 7/2003 |

* cited by examiner

HIGH-RELIABILITY CELL DETECTOR

TECHNICAL FIELD

The present disclosure belongs to the technical field of auxiliary devices for blood plasma collection machines, specifically relating to a high-reliability cell detector.

BACKGROUND ART

A blood plasma collection machine is a machine that uses the principle of centrifugation to collect blood plasma. It mainly consists of a centrifuge, display, machine body, liquid pump, and other components. It can quickly complete the collection of blood plasma. It can be used not only for the collection of raw material blood plasma for the production of blood products by blood product companies but also for the collection of fresh frozen plasma, with broad practicality.

Existing blood plasma collection machines, when in use, transport external blood to the inside of the plasma collection machine through a transfusion tube. Existing plasma collection machines do not have the function to detect blood within the transfusion tube, which can inconvenience operators in determining whether there is blood in the transfusion tube. Therefore, this disclosure proposes a high-reliability cell detector.

SUMMARY OF THE DISCLOSURE

The purpose of this disclosure is to provide a high-reliability cell detector to solve the problems mentioned in the background technology.

To achieve the above objectives, the present disclosure provides the following technical solutions: a high-reliability cell detector, including a machine body and a blood cell detector installed on the top of the machine body. The blood cell detector includes a vascular frame installed on the top surface of the machine body, with a U-shaped tube orifice at the top of the vascular frame. The inner wall of the U-shaped tube orifice is embedded with a transmissive photo sensor, which includes a light emitter and a light receiver, and the light emitter and light receiver are respectively embedded in the inner walls on both sides of the U-shaped tube orifice.

Preferably, the bottom surface of the vascular frame is provided with a circular mounting groove, and an electromagnetic suction cup is embedded within the circular mounting groove. The surface of the electromagnetic suction cup is equipped with a connecting wire, which passes to the outside of the vascular frame. The electromagnetic suction cup is magnetically connected to the top surface of the machine body.

Preferably, L-shaped side slots are symmetrically provided on both side surfaces of the vascular frame. An L-shaped block is arranged inside the L-shaped side slot, and a limit card head is fixed at the bottom end of the L-shaped block. Limit card slots are provided on both side surfaces of the electromagnetic suction cup, and the end of the limit card head penetrates to the inside of the limit card slot.

Preferably, a rectangular slot is provided on one inner wall of the L-shaped side slot, and a spring and a side slider are arranged inside the rectangular slot. The side slider is fixed to the top end of the L-shaped block.

Preferably, a protruding rod is fixed to one side surface of the L-shaped block, and a rotating pull block is rotatably mounted at the end of the protruding rod.

Preferably, base pads are installed on the inner walls on both sides of the U-shaped tube orifice, opposite the top of the transmissive photo sensor, and the surface of the base pad is provided with strip protrusions.

Preferably, the base pad and the strip protrusion are of an integrated structure, and the cross-section of the strip protrusion is semi-circular.

Compared with the Existing Technology, the Beneficial Effects of the Disclosure are:

1. By installing a blood cell detector on the top of the blood plasma collection machine, the transfusion tube can be clamped at the top of the blood cell detector, allowing the blood cell detector to detect in real-time whether there are blood cells in the transfusion tube. The blood cell detector has high recognition accuracy, high reliability, and strong resistance to bubble interference.

2. By embedding an electromagnetic suction cup at the bottom of the blood cell detector, the installation position of the blood cell detector can be flexibly adjusted according to actual usage, greatly improving the flexibility of the blood cell detector, and the electromagnetic suction cup is easy to install and remove.

3. By setting the base pad and strip protrusion, a good limiting effect can be achieved for the transfusion tube entering the inside of the U-shaped tube orifice, thus improving the stability of the use of the blood cell detector.

LIST OF REFERENCE NUMERALS

1—vascular frame; 2—U-shaped tube orifice; 3—transmissive photo sensor; 4—machine body; 5—electromagnetic suction cup; 6—L-shaped side slot; 7—L-shaped block; 8—rotating pull block; 9—rectangular slot; 10—spring; 11—side slider; 12—limit card head; 13—limit card slot; 14—base pad; 15—strip protrusion.

DETAILED DESCRIPTION OF EMBODIMENTS

The technical solutions in the embodiments of the present disclosure will be clearly and completely described below in conjunction with the accompanying drawings in the embodiments of the present disclosure. It is obvious that the described embodiments are only part of the embodiments of the present disclosure, not all embodiments. Based on the embodiments in this disclosure, all other embodiments obtained by those of ordinary skill in the art without creative efforts fall within the protection scope of the present disclosure.

Embodiment

Figure 1:
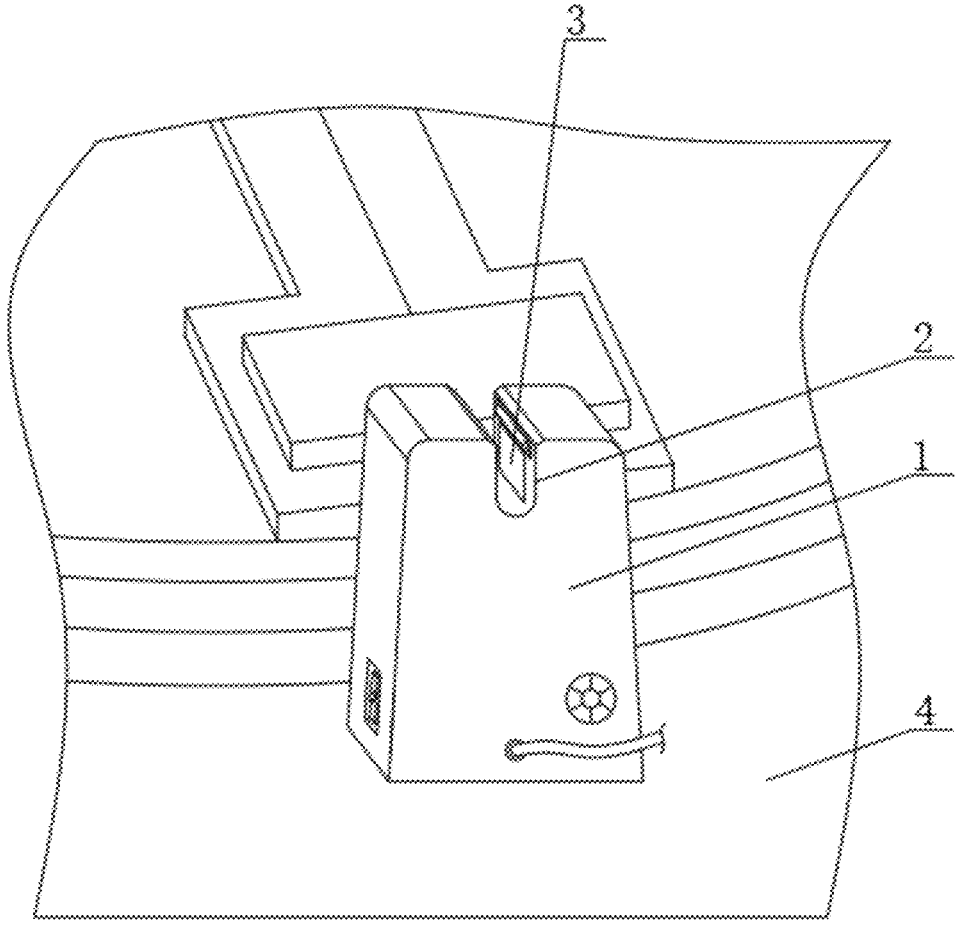
FIG. 1 is a perspective view of the disclosure installed on a blood plasma collection machine.
Figure 2:
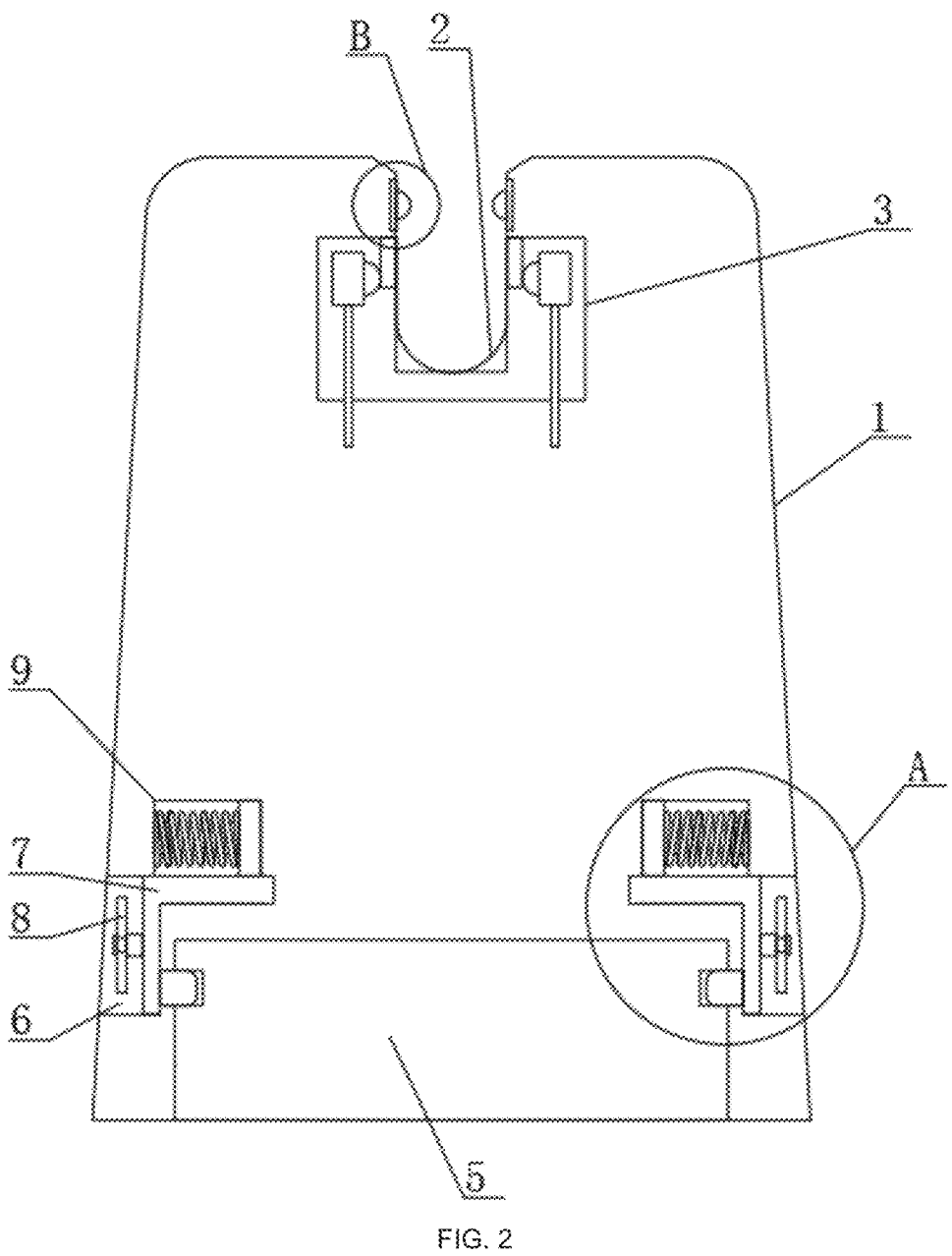
FIG. 2 is a sectional view of the disclosure.
Figure 3:
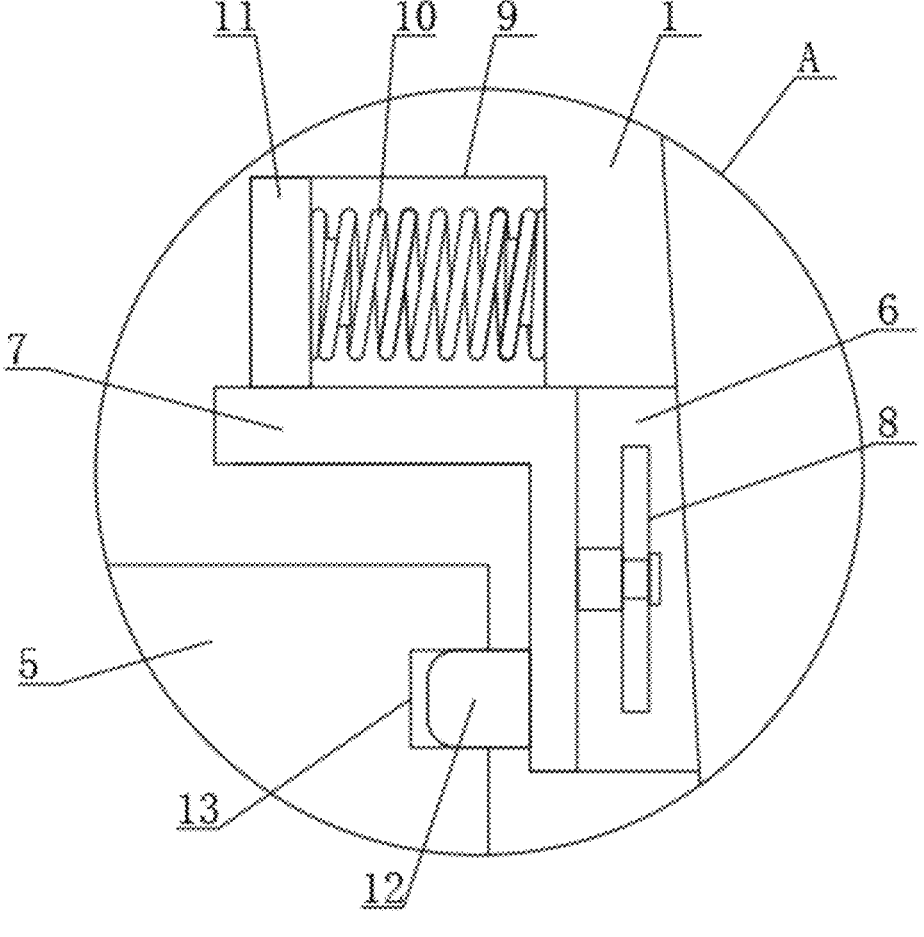
FIG. 3 is a partial enlarged view of area A in FIG. 2.
Figure 4:
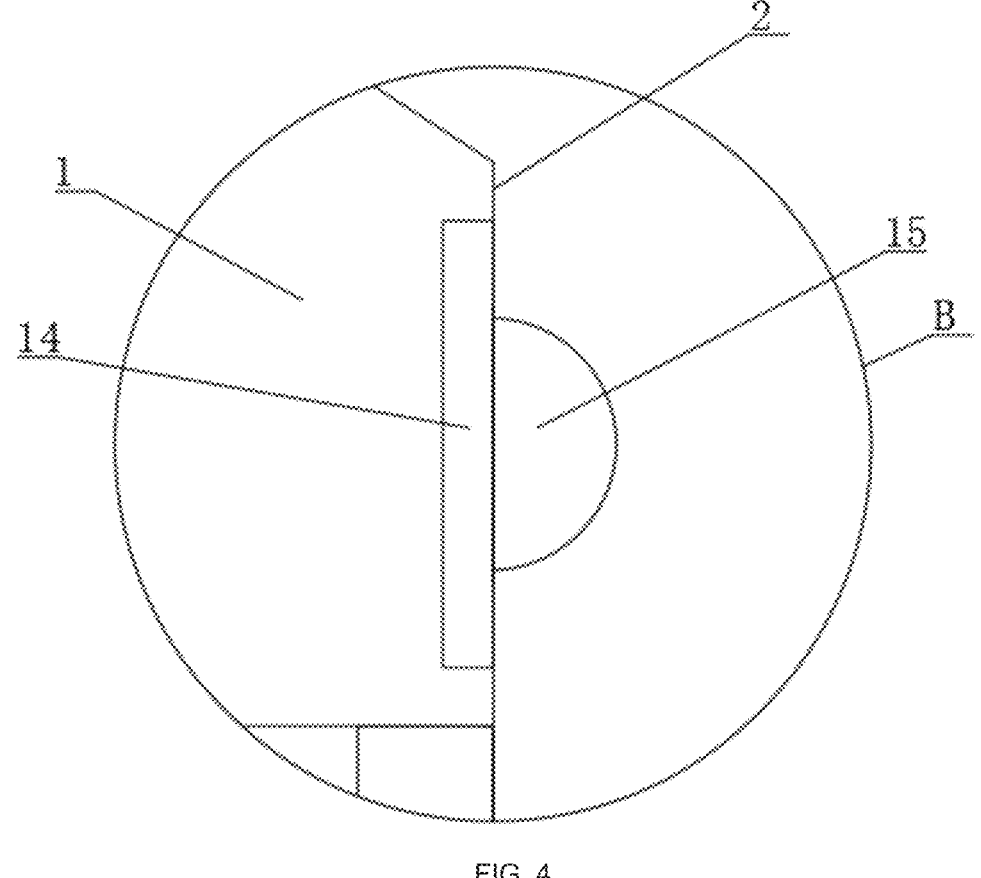
FIG. 4 is a partial enlarged view of area B in FIG. 2.

Please refer to FIGS. 1 to 4, the disclosure provides a technical solution: a high-reliability cell detector, including a machine body 4 and a blood cell detector installed on the top of the machine body 4. The blood cell detector includes a vascular frame 1 installed on the top surface of the machine body 4, with a U-shaped tube orifice 2 at the top of the vascular frame 1, and the inner wall of the U-shaped tube orifice 2 is embedded with a transmissive photo sensor 3. The transmissive photo sensor 3 includes a light emitter and a light receiver, and the light emitter and light receiver are respectively embedded in the inner walls on both sides of the U-shaped tube orifice 2, allowing the transmissive photo sensor 3 to detect in real-time whether there are blood cells inside the transfusion tube through the light emitter and light receiver. The surface of the vascular frame 1 is provided with an adjustment hole below and to the right of the U-shaped tube orifice 2, and an adjustment bolt is set inside the adjustment hole. The inside of the vascular frame 1 is equipped with a PLC controller connected to the adjustment bolt, allowing the operator to later insert a screwdriver into the adjustment hole and then twist the adjustment bolt, causing the adjustment bolt to adjust the detection sensitivity of the cell detector through the PLC controller.

In this embodiment, preferably, the bottom surface of the vascular frame 1 is provided with a circular mounting groove, and an electromagnetic suction cup 5 is embedded within the circular mounting groove. The surface of the electromagnetic suction cup 5 is equipped with a connecting wire, which passes to the outside of the vascular frame 1. The electromagnetic suction cup 5 is magnetically connected to the top surface of the machine body 4, and the magnetic installation method allows the installation position of the blood cell detector to be flexibly adjusted according to actual usage.

In this embodiment, preferably, L-shaped side slots 6 are symmetrically provided on both side surfaces of the vascular frame 1. An L-shaped block 7 is arranged inside the L-shaped side slot 6, and a limit card head 12 is fixed at the bottom end of the L-shaped block 7. Limit card slots 13 are provided on both side surfaces of the electromagnetic suction cup 5, and the end of the limit card head 12 penetrates to the inside of the limit card slot 13. A rectangular slot 9 is provided on one inner wall of the L-shaped side slot 6, and a spring 10 and a side slider 11 are arranged inside the rectangular slot 9. The side slider 11 is fixed to the top end of the L-shaped block 7. A protruding rod is fixed to one side surface of the L-shaped block 7, and a rotating pull block 8 is rotatably mounted at the end of the protruding rod, making the electromagnetic suction cup 5 easy to install and remove.

In this embodiment, preferably, base pads 14 are adhesively installed on the inner walls on both sides of the U-shaped tube orifice 2, opposite the top of the transmissive photo sensor 3, and the surface of the base pad 14 is provided with strip protrusions 15. The base pad 14 and the strip protrusion 15 are of an integrated structure, and both the base pad 14 and the strip protrusion 15 are made of rubber material. The cross-section of the strip protrusion 15 is semi-circular, which can provide a good limiting effect for the transfusion tube entering the inside of the U-shaped tube orifice 2.

In this disclosure, the model of the transmissive photo sensor 3 is Omron EE-SX1350 transmissive;

In this disclosure, the model of the electromagnetic suction cup 5 is KTF-05;

The working principle and usage process of the disclosure: When using the blood cell detector, first install the vascular frame 1 on the top of the machine body 4, then push the transfusion tube that transports blood into the inside of the U-shaped tube orifice 2, and ensure that the transfusion tube is limited by the strip protrusion 15, allowing the transmissive photo sensor 3 to detect in real-time whether there are blood cells inside the transfusion tube through the light emitter and light receiver;

When it is necessary to install the electromagnetic suction cup 5 at the bottom of the vascular frame 1, first pull the rotating pull block 8 to the side, causing the L-shaped block 7 and limit card head 12 to move to the side, until the rotating pull block 8 is pulled to the outside of the vascular frame 1. Then, rotate the rotating pull block 8 ninety degrees, allowing the ends of the rotating pull block 8 to rest on the outer surface of the vascular frame 1, preventing the L-shaped block 7 and limit card head 12 from rebounding. Next, push the electromagnetic suction cup 5 into the circular mounting groove at the bottom of the vascular frame 1, then rotate the rotating pull block 8 back and release it, causing the spring 10 to push back the side slider 11, thereby causing the L-shaped block 7 and limit card head 12 to rebound, and finally allowing the limit card head 12 to snap into the limit card slot 13 on the surface of the electromagnetic suction cup 5, completing the quick installation of the electromagnetic suction cup 5. Then, power on the electromagnetic suction cup 5 to cause it to adhere tightly to the top surface of the machine body 4, completing the quick installation of the blood cell detector. To adjust the position of the blood cell detector subsequently, simply power off the electromagnetic suction cup 5, adjust the position of the blood cell detector, and then power on the electromagnetic suction cup 5 again to complete the magnetic positioning of the vascular frame 1 once more, allowing the installation position of the blood cell detector to be flexibly adjusted according to actual usage.

Although the embodiments of the present disclosure have been shown and described, it will be understood by those skilled in the art that various changes, modifications, substitutions, and variations can be made in these embodiments without departing from the principle and spirit of the disclosure. The scope of the disclosure is defined by the appended claims and their equivalents.

The invention claimed is:

1. A high-reliability cell detector, comprising a machine body and a blood cell detector mounted on a top of the machine body, wherein the blood cell detector comprises a vascular frame mounted on a top surface of the machine body, a top end of the vascular frame is provided with a U-shaped tube orifice, and an inner wall of the U-shaped tube orifice is embedded with a transmissive photo sensor, the transmissive photo sensor includes a light emitter and a light receiver, and the light emitter and light receiver are respectively embedded on two side inner walls of the U-shaped tube orifice, wherein a bottom surface of the vascular frame is provided with a circular mounting groove, and an electromagnetic suction cup is embedded in the circular mounting groove, a surface of the electromagnetic suction cup is provided with a connecting wire, the connecting wire runs through to an outside of the vascular frame, and the electromagnetic suction cup is magnetically connected to the top surface of the machine body.

2. The high-reliability cell detector according to claim 1, wherein two side surfaces of the vascular frame are symmetrically provided with L-shaped side slots, an inside of the L-shaped side slot is provided with an L-shaped block, a bottom end of the L-shaped block is fixed with a limit card head, the two side surfaces of the electromagnetic suction cup are provided with limit card slots, and an end of the limit card head-runs through to an inside of the limit card slot.

3. The high-reliability cell detector according to claim 2, wherein one side inner wall of the L-shaped side slot is provided with a rectangular slot, and the rectangular slot is provided with a spring and a side slider, the side slider is fixed to a top end of the L-shaped block.

4. The high-reliability cell detector according to claim 2, wherein one side surface of the L-shaped block is fixed with a protruding rod, and an end of the protruding rod is rotatably provided with a rotating pull block.

5. The high-reliability cell detector according to claim 1, wherein the two side inner walls of the U-shaped tube orifice are provided with a base pad opposite a top of the transmissive photo sensor, and a surface of the base pad is provided with a strip protrusion.

6. The high-reliability cell detector according to claim 5, wherein the base pad and the strip protrusion are of an integral structure, and a cross-section of the strip protrusion is semi-circular.

* * * * *